(12) United States Patent
Martin (10) Patent No.: US 7,525,234 B2
(45) Date of Patent: Apr. 28, 2009

(54) DRIVE CIRCUIT FOR AN INJECTOR ARRANGEMENT

(75) Inventor: Steven J Martin, Canterbury (GB)

(73) Assignee: Delphi Technologies, Inc., Troy, MI (US)

( * ) Notice: Subject to any disclaimer, the term of this patent is extended or adjusted under 35 U.S.C. 154(b) by 195 days.

(21) Appl. No.: 10/573,009

(22) PCT Filed: Sep. 23, 2004

(86) PCT No.: PCT/GB2004/004067

§ 371 (c)(1),
(2), (4) Date: Jan. 8, 2007

(87) PCT Pub. No.: WO2005/028836

PCT Pub. Date: Mar. 31, 2005

(65) Prior Publication Data

US 2007/0103033 A1    May 10, 2007

(30) Foreign Application Priority Data

Sep. 23, 2003    (EP) .................................. 03255965

(51) Int. Cl.
*H01L 41/09* (2006.01)
(52) U.S. Cl. ................... 310/317; 310/316.03
(58) Field of Classification Search ............ 310/316.03, 310/317; 123/498
See application file for complete search history.

(56) References Cited

U.S. PATENT DOCUMENTS 6,016,040 A    1/2000    Hoffmann et al.

(Continued)

FOREIGN PATENT DOCUMENTS

DE    19734895    2/1999

(Continued)

OTHER PUBLICATIONS

Machine Translation of EP1398488 provided from http://babelfish.yahoo.com.*

(Continued)

*Primary Examiner*—Quyen P Leung
*Assistant Examiner*—Derek J Rosenau
(74) *Attorney, Agent, or Firm*—David P. Wood (57) ABSTRACT

A drive circuit (20a, 20b) for an injector arrangement having at least one piezoelectric injector (12a, 12b) is described. The drive circuit comprises: a first charge storage means (C2) for operative connection with the injector (12a, 12b) during a discharging phase so as to discharge current to flow therethrough, thereby to initiate an injection event; a second charge storage means (C1) for operative connection with the injector (12a, 12b) during a charging phase so as to cause a charging current to flow therethrough, thereby to terminate the injection event; a switch means (Q1,Q2) for controlling whether the first charge storage means (C2) is operably connected to the injector or whether the second charge storage means (C1) is operably connected to the injector; a first voltage supply rail at a first voltage level; a second voltage supply rail at a second voltage level higher than the first; a voltage supply means (22,36); and regeneration switch means (Q5,Q2,L1) operable at the end of the charging phase to transfer charge from the voltage supply means to at least the second charge storage means (C1) via an energy storage device (L1) prior to a subsequent discharging phase.

19 Claims, 9 Drawing Sheets

U.S. PATENT DOCUMENTS 6,060,814 A * 5/2000 Hoffmann et al. ...... 310/316.03
2004/0057189 A1 * 3/2004 Cheever et al. ............. 361/160

FOREIGN PATENT DOCUMENTS

| DE | 19825210 | 10/1999 |
| DE | 19723935 | 1/2000 |
| DE | 10120143 | 10/2002 |
| DE | 10245135 | 4/2003 |
| EP | 1398488 A1 * | 3/2004 |
| FR | 2829314 | 7/2003 |
| JP | 62017338 | 1/1987 |
| JP | 02185650 | 7/1990 |
| JP | 05344755 | 12/1993 |
| JP | 2006-527473 | 6/2006 |

OTHER PUBLICATIONS

Japanese Office Action dated Jul. 1, 2008.

* cited by examiner

Fig. 5c

DRIVE CIRCUIT FOR AN INJECTOR ARRANGEMENT

TECHNICAL FIELD

The present invention relates to a drive circuit for an injector arrangement. It relates particularly, although not exclusively, to a drive circuit for an injector arrangement for an internal combustion engine, the injector arrangement including at least one injector of the type having a piezoelectric actuator for controlling injector valve needle movement.

BACKGROUND ART

Automotive vehicle engines are generally equipped with fuel injectors for injecting fuel (e.g., gasoline or diesel fuel) into the individual cylinders or intake manifold of the engine. The engine fuel injectors are coupled to a fuel rail which contains high pressure fuel that is delivered by way of a fuel delivery system. In diesel engines, conventional fuel injectors typically employ a valve that is actuated to open and close to control the amount of fluid fuel metered from the fuel rail and injected into the corresponding engine cylinder or intake manifold.

One type of fuel injector that offers precise metering of fuel is the piezoelectric fuel injector. Piezoelectric fuel injectors employ piezoelectric actuators made of a stack of piezoelectric elements arranged mechanically in series for opening and closing an injection valve to meter fuel injected into the engine. Examples of piezoelectric fuel injectors are disclosed in U.S. Pat. Nos. 4,101,076 and 4,635,849. Piezoelectric fuel injectors are well-known for use in automotive engines.

The metering of fuel with a piezoelectric fuel injector is generally achieved by controlling the electrical voltage potential applied to the piezoelectric elements to thereby vary the amount of expansion and contraction of the piezoelectric elements. The amount of expansion and contraction of the piezoelectric elements varies the travel distance of a valve piston and, thus, the amount of fuel that is passed through the fuel injector. Piezoelectric fuel injectors offer the ability to precisely meter a small amount of fuel. However, piezoelectric fuel injectors also generally require relatively high voltages (typically in the hundreds of volts) and high currents (tens of amps) in order to function properly.

Known conventional drive circuitry for controlling a piezoelectric fuel injector is generally complicated and requires extensive energy. This energy is usually provided by a dedicated power supply such as a transformer which steps-up the voltage generated by the vehicle battery (e.g., 12 volts) to a higher voltage (e.g., 230 volts). The step-up voltage is then applied to large reservoir capacitors for powering the charging and discharging of one or more fuel injectors for each injection event. This dedicated power supply generates enough energy to maintain the reservoir capacitor voltage over the full operating load and speed range of the engine. However, a disadvantage of providing a dedicated power supply of this size is increased cost. Thus, a further disadvantage is that the controller required to control the drive circuit must be of large size.

German patent application no. DE 102 45 135 A1 (Nippon Soken, Inc. et al) describes a drive circuit for controlling a plurality of piezoelectric fuel injectors. The drive circuit comprises a DC/DC voltage converter 21 for stepping up the voltage produced by a vehicle battery. The stepped-up voltage is applied to capacitors in the circuit which are then used for charging the fuel injector piezoelectric elements. The drive circuit comprises a single voltage supply rail and operates in a purely unidirectional manner (i.e., it does not provide negative voltages), and therefore cannot be used to drive bi-directional fuel injectors which require both negative and positive voltages.

It has been suggested that vehicle manufacturers are planning to replace 12 volt vehicle batteries with a 42 volt charging system. This change has been prompted by the move to replace mechanical and hydraulic systems with electronics (i.e. "drive-by-wire"), and will provide a way to improve fuel economy and reduce emissions. Another problem with current drive circuits is that it is difficult to control dynamically the voltage across the large reservoir capacitors should the higher 42 voltage supply (or a lower voltage supply) be required.

An object of the invention is therefore to provide a drive circuit which requires less components than existing drive circuits for injector arrangements, and which is therefore cheaper and more controllable than such drive circuits. Another object of the invention is to provide a drive circuit which is suitable for use with voltage supplies having different capabilities.

SUMMARY OF THE INVENTION

According to a first aspect of the present invention there is provided a drive circuit for an injector arrangement having at least one injector the drive circuit comprising: a first voltage rail ($V_0$; $V_{supply}$) at a first voltage level; a second voltage rail ($V_1$) at a second voltage level higher than the first voltage level; a voltage supply means (22,36); first charge storage means (C2) for operative connection with one of the at least one injectors (12a,12b) during a discharging phase so as to permit a discharge current to flow therethrough, thereby to initiate an injection event; second charge storage means (C1), connected across the first and second voltage rails ($V_0$; $V_{supply}$,V1) for operative connection with the at least one injector (12a,12b) during a charging phase so as to cause a charge current to flow therethrough, thereby to terminate the injection event; switch means (Q1,Q2) for controlling whether the first charge storage means (C2) is operably connected to the at least one injector or whether the second charge storage means (C1) is operably connected to the at least one injector; and regeneration switch means (Q5,Q2, L1) operable at the end of the charging phase to transfer charge from the voltage supply means to at least the second charge storage means via an energy storage device (L1), prior to a subsequent discharging phase.

Preferably the first charge storage means is connected across the first voltage rail and ground.

In a first embodiment of the present invention, the regeneration switch means is preferably operable at the end of the charging phase to transfer charge from the voltage supply means to the first charge storage means, and then to the second charge storage means from the first charge storage means via the energy storage device. Most preferably, the regeneration switch means is used to transfer charge from the voltage supply means to both the first and second voltage rails such that the voltage across the first and second charge storage means is increased. In this embodiment, the voltage supply means advantageously comprises a vehicle battery and a transformer to step-up the voltage generated by the vehicle battery to a higher voltage suitable for applying to the first charge storage means. An advantage of this embodiment of the present invention is that the voltage supply means is only used to increase the charge on the first charge storage means, and therefore a smaller and cheaper voltage supply means may be used than in known drive circuits. A further advantage of this embodiment of the present invention is that if the voltage supply means provides a 42 Volt charging system, and the injectors are operable at a similar voltage, then a transformer may not be required, thereby leading to a further reduction in the size and cost of the voltage supply means.

In a second embodiment of the present invention, the regeneration switch means is preferably operable at the end of the charging phase to transfer charge from the voltage supply means to the first charge storage means and also to the second charge storage means prior to the subsequent discharging phase. Most preferably, the regeneration switch means is used to transfer charge from the voltage supply means to the second voltage rail such that the voltage across the second charge storage means is increased (the first voltage rail being supplied by the voltage supply means). Preferably the voltage supply means comprises a vehicle battery, and advantageously no transformer is required to step up the voltage generated by the vehicle battery. The advantage of this embodiment is that there is no need to provide a dedicated power supply (such as a transformer) which leads to a cheaper and more controllable drive circuit than those known in the prior art.

If injectors which are operable at approximately –12 Volts are utilised in the drive circuit, then the ratio of the capacitance of the first charge storage means to the second charge storage means is preferably selectable to achieve the required injector negative operating voltage.

In both embodiments of the present invention, the drive circuit may further comprise a switch means including a first switch (such as a "charge" switch) operable to close to activate the charging phase, and a second switch (such as a "discharge" switch) operable to close to activate the discharging phase. Thus, in the first embodiment, the regeneration switch means is preferably arranged to transfer charge from the voltage supply means to the second charge storage means in response to the operation of the second switch, as charge is supplied to the first charge storage means by the voltage supply means. However, in the second embodiment, the regeneration switch means is preferably arranged to transfer charge from the voltage supply means to the first and second charge storage means in response to the operation of the second switch.

The regeneration switch means need not be operable between all injection events, but may be selectively operable between only some injection events.

Preferably the first and second charge storage means comprise capacitors, and the energy storage device is an inductor.

Preferably the drive circuit includes first and second injectors which are arranged in parallel and operatively connected to the switch means, the regeneration switch means, and a further switch means for controlling independent selection of the first or second injector to permit a discharging current to be supplied to the selected injector during a discharge phase so as to initiate an injection event.

The drive circuit is preferably configured as a half H-bridge circuit having a middle circuit branch, with the first and second injectors being arranged in parallel in the middle circuit branch.

The drive circuit may also include voltage sensing means for sensing the voltage across the selected injector (and also the unselected injector, if desired), and control means for receiving a signal indicative of the sensed voltage and providing a termination control signal to the further switch means to terminate the charging phase of the selected injector once a predetermined charge threshold voltage is sensed. The control means may also be arranged to provide an initiate signal to the switch means to initiate the charging phase of the selected injector. The control means may also be arranged to provide an initiate control signal to the switch means to initiate the discharge mode of the selected injector, and to provide a terminate control signal to the switch means to terminate the discharge phase once a predetermined threshold discharge voltage is sensed.

The drive circuit may also include sensing means for sensing the voltage on the first and second capacitors. The control means may also be arranged to provide an initiate signal to initiate the regeneration phase of the circuit, and to provide a terminate signal to terminate the regeneration phase.

The control means may further be arranged to provide a pulse width modulated signal to alternately enable and disable the discharge switch (i.e. to pulse the discharge switch on and off) during the regeneration phase.

By "enabling" the discharge switch, it is meant that the discharge switch is put in a state so that it may be activated (i.e. closed), whether under the direct control of the microprocessor via a pulse width modulated signal, by the regeneration current falling below a predetermined current level, or via any other suitable method. Similarly, by "disabling" the discharge switch, it is meant that the discharge switch is put in a state so that it cannot be activated without first being enabled.

The drive circuit of the present invention is appropriate for controlling a bank of at least two injectors, with each injector being arranged to inject fuel to an associated combustion space or engine cylinder. The bank may include any number of injectors, and an engine may have more than one injector bank, depending on the number of engine cylinders. The drive circuit is equally applicable, however, to controlling just a single injector. Due to the drive circuit of the present invention having first and second voltage rails, the drive circuit operates in a bi-directional manner and is therefore suitable for driving bi-polar fuel injectors which require both positive and negative voltages for their operation.

According to a second aspect of the present invention there is provided a control method for an injector arrangement having at least one injector, the method comprising: operably connecting a first charge storage means to one of the at least one injectors during a discharging phase so as to cause a discharge current to flow therethrough, thereby to initiate an injection event; operably connecting a second charge storage means with the at least one injector during a charging phase so as to cause a charge current to flow therethrough, thereby to terminate the injection event; activating a regeneration switch means at the end of the charging phase to initiate a regeneration phase wherein charge is transferred from a voltage supply means to an energy storage device, and transferred from the energy storage device to at least the second charge storage means prior to the subsequent discharging phase; and deactivating the regeneration switch means to terminate the regeneration phase.

In one embodiment of the present invention, during the activating step charge is transferred from the voltage supply means to the energy storage device, and subsequently transferred from the energy storage device to the first and second charge storage means. In another embodiment of this aspect of the invention, during the activating step charge is transferred from the voltage supply means to the first charge storage means, and subsequently transferred from the first charge storage means to the energy storage device for transfer to the second charge storage means.

Preferably the steps of transferring charge to and from the energy storage device are carried out periodically, most preferably under the control of a pulse-width modulated (PWM) signal.

The efficiency of the fuel injectors determines how much energy is removed from the first and second charge storage means, and also determines a peak current in the energy storage device over a period of time to regenerate the charge stored on the first and second charge storage means. In other words, the more efficient the injector, the less current in the energy storage device, and the shorter regeneration time required. It is therefore a preferable feature of the present invention that the regeneration time is controllable.

Preferably the method includes the further step of varying the characteristics (such as duty-cycle and modulating frequency) of the PWM signal. The duty-cycle required may depend upon the voltage of the voltage supply means. For example, if the voltage of the voltage supply means is low, then longer PWM ON times are required and, conversely, if the voltage of the voltage supply means is high, then shorter PWM ON times are necessary. The duty-cycle and/or modulating frequency of the PWM signal are optionally varied by the microprocessor, for example to directly actuate the regeneration switch means. Preferably, the characteristics of the PWM signal may be controlled by allowing the drive circuit to detect the current in the energy storage device by starting a normal discharge event, but selecting the regeneration switch means rather than an injector.

The method may include the further step of controlling whether the first or second charge storage means is operably connected to the injector.

The method may also include the steps of providing a regeneration initiate signal to activate the regeneration switch means and hence begin the regeneration phase, and providing a regeneration terminate signal to deactivate the regeneration switch means and thus terminate the regeneration phase.

Preferably the regeneration initiate signal may be provided after each injection event. Alternatively, the regeneration initiate signal may be provided after a predetermined number of injection events. That is, the regeneration phase may be carried out between injection events. Advantageously, the regeneration phase is carried out for a period necessary to maintain a constant charge on the first and second charge storage means.

It will be appreciated that although the present invention is particularly applicable to an injector system in which the injectors have piezoelectric actuators, it is equally applicable to any system in which the injectors have capacitive-like properties, for example motor-driven injectors.

BRIEF DESCRIPTION OF DRAWINGS

Preferred embodiments of the present invention will now be described, by way of example, with reference to the accompanying drawings, in which.

DETAILED DESCRIPTION OF PREFERRED EMBODIMENTS

Figure 1:
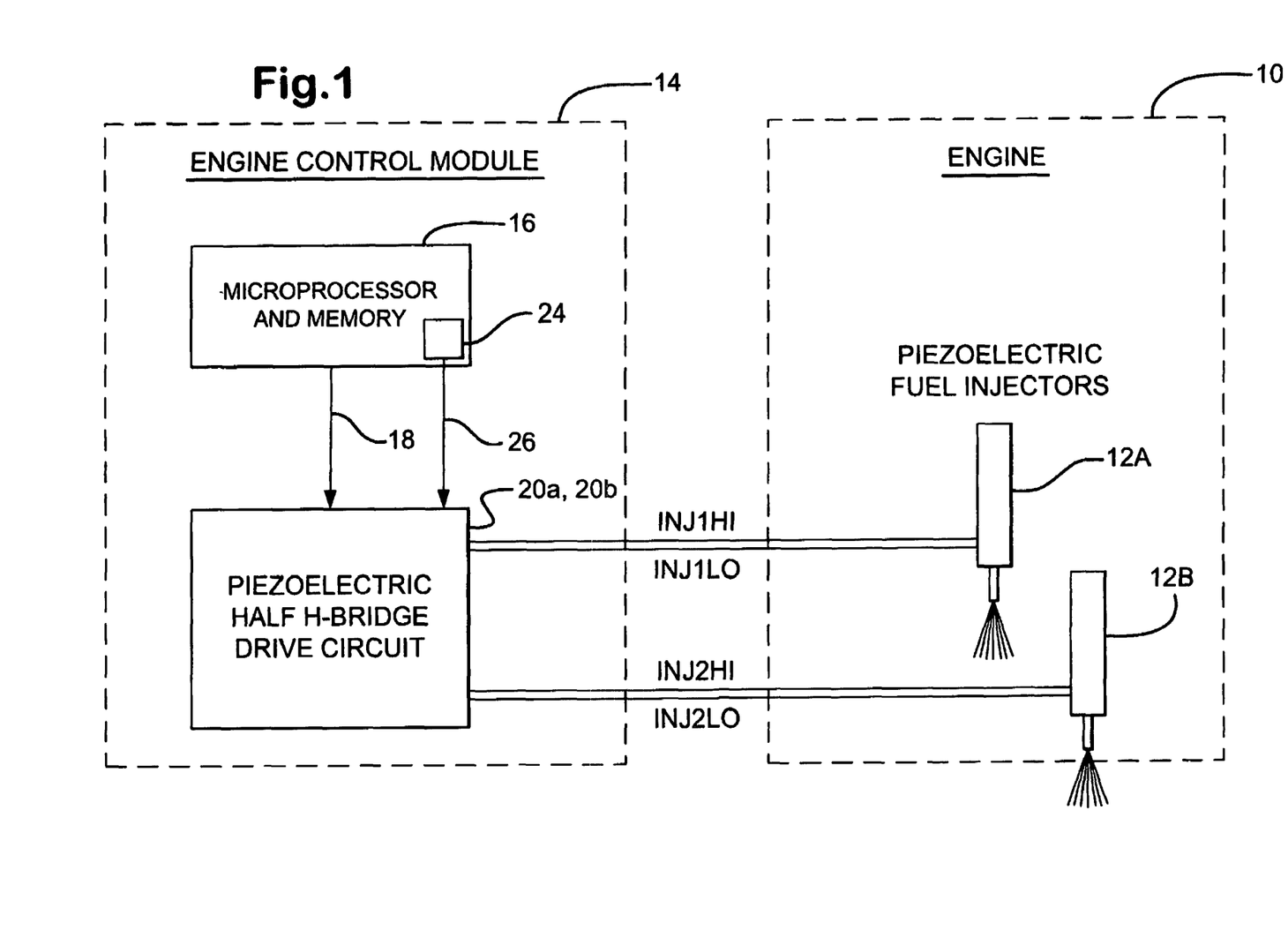
FIG. 1 is a block diagram illustrating a drive circuit according to preferred embodiments of the present invention for controlling a piezoelectric fuel injector in an engine.

Referring to FIG. 1, an engine 10, such as an automotive vehicle engine, is generally shown having a first and second piezoelectric fuel injectors 12a and 12b for metering and injecting fuel into individual cylinders or an intake manifold of the engine 10. The piezoelectric fuel injectors 12a and 12b control the amount of fluid (e.g., liquid) fuel injected from a fuel rail of a fuel delivery system into an engine during each fuel injection stroke of the engine 10. The piezoelectric fuel injectors 12a and 12b may be employed in a diesel engine to inject diesel fuel into the engine, or may be employed in a spark ignited internal combustion engine to inject combustible gasoline into the engine. While two piezoelectric fuel injectors 12a and 12b are shown and described in the embodiment of FIG. 1, it should be appreciated that the engine 10 may include more piezoelectric fuel injectors, all of which could be controlled by a common drive circuit.

The engine 10 is generally controlled by an engine control module (ECM) 14. The ECM 14 generally includes a microprocessor and memory 16 for performing various control routines for controlling the operation of the engine 10, including control of the fuel injection. The ECM 14 may monitor engine speed and load and control the amount of fuel and injection timing for injecting fuel into the engine cylinder. Also included in the microprocessor and memory 16 is a pulse-width modulated signal generator 24 for generating pulse-width modulated (PWM) signals 26, the purpose of which will be described in detail later.

According to the present invention, a piezoelectric half H-bridge drive circuit 20a,20b is shown integrated into the engine control module 14. The drive circuit 20a,20b is arranged to monitor and control the injector high side voltages INJ1HI, INJ2HI and injector low side voltages INJ1LO, INJ2LO to control actuation of the piezoelectric fuel injectors 12a and 12b to open and close the injectors. The piezoelectric drive circuit 20a,20b may be integrated in the engine control module 14 as shown, or may be provided separate therefrom. The microprocessor and memory 16 provide various control signals 18,26 to the drive circuit 20a,20b.

The piezoelectric drive circuit 20a,20b as shown and described herein operates in a discharge phase which discharges an injector 12a,12b to open the injector valve to inject fuel, and further operates in a charge phase which charges an injector 12a,12b to close the injector valve to prevent injection of fuel. In this case, the injectors are of the negative-charge displacement type. However, the drive circuit 20a,20b and injectors 12a and 12b could be otherwise configured to open during a charge phase and close during a discharge phase, wherein the injectors are of the positive-charge displacement type.

Figure 2A:
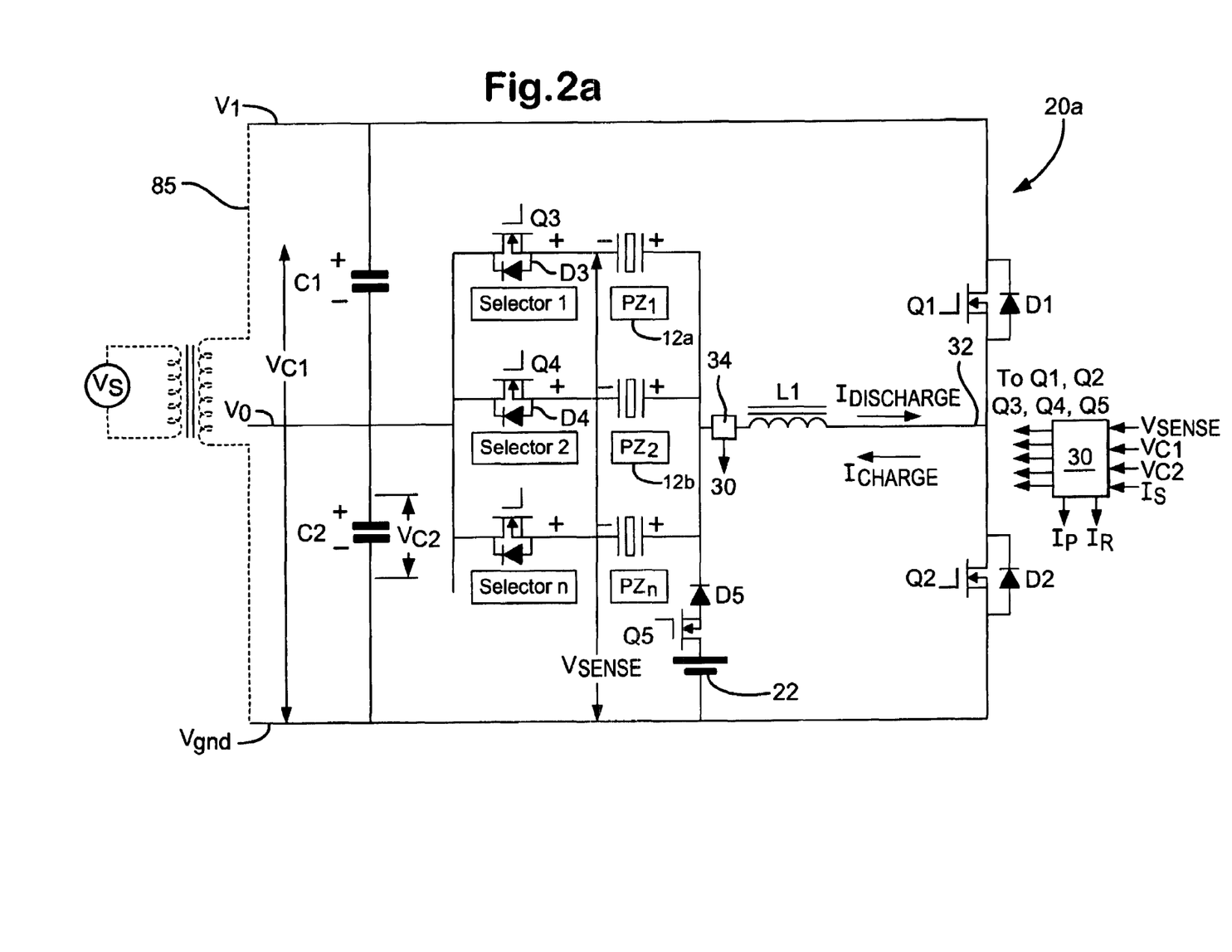
FIG. 2a is a circuit diagram illustrating the piezoelectric drive circuit of FIG. 1, according to a first embodiment of the present invention.

The piezoelectric drive circuit 20a, according to a first embodiment of the present invention, is illustrated in detail in the block/circuit diagram of FIG. 2a. The drive circuit 20a includes first and second voltage supply rails $V_0$ and $V_1$, and is generally configured as a half H-bridge having a middle circuit current path 32 which serves as a bi-directional current path. The middle circuit branch 32 includes an inductor L1 and a current sensing and control means 34, which is coupled in series with a parallel connection of the injectors 12a and 12b and associated switching circuitry. Each injector 12a and 12b has the electrical characteristics of a capacitor, with its piezoelectric actuator stack being chargeable to hold a voltage which is the potential difference between the charge (+) and discharge (−) terminals of the injector 12a and 12b. Charging and discharging of each injector 12a,12b is achieved by controlling the flow of current through the bi-directional current path 32 by means of the microprocessor 16.

The drive circuit 20a further includes first and second switches Q1 and Q2 for controlling the charge and discharge operations of the injector 12a and/or 12b. The switches Q1 and Q2 may each include an n-channel insulated gate bi-polar transistor (IGBT) having a gate controlling current flow from the collector to the emitter. Each of switches Q1 and Q2 allows for unidirectional current flow from the collector to the emitter when turned on, and prevents current flow when turned off. Each switch Q1,Q2 has a respective recirculation diode D1,D2 connected across it to allow a recirculation current to return to energy storage capacitors C1,C2 during an energy recovery or recirculation phase of operation of the circuit, and also a regeneration phase, as described in detail below. The first energy storage capacitor C1 is connected across the first and second voltage supply rails $V_0$ and $V_1$, whereas the second energy storage capacitor C2 is connected across the first voltage supply rail $V_0$ and ground.

The drive circuit 20a also includes a voltage source 22 such as a vehicle battery. However, unlike known drive circuits for injector arrangements, the drive circuit 20a of the first embodiment of the present invention does not include a dedicated power supply for supplying energy to the first C1 and second C2 energy storage capacitors, such as that indicated by the dashed lines 85 in FIG. 2a.

Each of the injectors 12a,12b is connected in series with an associated selector switch Q3,Q4. Each selector switch Q3,Q4 typically takes the form of an IGBT having a gate coupled to a gate drive which is powered at a bias supply input. When the selector switch Q3 associated with the first injector 12a, for example, is activated (i.e. switched on), current flow ($I_{DISCHARGE}$) is permitted in a discharge direction through the selected injector. A diode D3 is connected in parallel with the selector switch Q3 to allow current ($I_{CHARGE}$) to flow in the charge direction during the charging phase of operation of the circuit. Similarly, a diode D4 is connected in parallel with the selector switch Q4 for the second injector 12b.

A regeneration switch Q5 is included in the circuit 20 between the inductor L1 and the vehicle battery 22, for connecting (and disconnecting) the battery to the first C1 and second C2 capacitors. The regeneration switch Q5 typically takes the form of an IGBT having a gate coupled to a gate drive which is powered at a bias supply input. A diode D5 is connected in series with the regeneration switch Q5 for preventing current from flowing therethrough during the charge phase.

The current sensing and control means 34 is arranged to sense the current in the path 32, to compare the sensed current with predetermined current thresholds $I_P$ and $I_R$, and to generate output signals, where $I_P$ is the peak current threshold, and $I_R$ is the recirculation current threshold. Predetermined values for $I_P$ and $I_R$ are stored in the microprocessor and memory 16, along with a charge voltage threshold ($V_{CHARGE}$), and a discharge voltage threshold ($V_{DISCHARGE}$). Predetermined voltage levels $V_{gc1}$ and $V_{gc2}$ across capacitors C1 and C2, for determining when the regeneration phase is to be terminated, may also be stored in the microprocessor and memory 16. If required, the current thresholds $I_P$ and $I_R$, the voltage thresholds, $V_{CHARGE}$ and $V_{DISCHARGE}$, and the voltage levels, $V_{gc1}$ and $V_{gc2}$, may be adjustable.

A voltage sensing means (not shown) is also provided to sense the voltage, $V_{SENSE}$, across the injector 12a,12b that is selected for injection. The voltage sensing means may also be used to sense the voltages $V_{C1}$ and $V_{C2}$ across the first C1 and second C2 capacitors, and the vehicle battery 22 voltage. The microprocessor and memory 16 further provides a charge/discharge signal C/D (which may be used to enable and disable a switch), an injector selector for selecting one of the injectors during the discharge operation, and a control signal for activating the regeneration switch Q5.

The drive circuit 20a also includes control logic 30 for receiving the output of the current sensing and control means 34, the sensed voltage, $V_{SENSE}$, from the positive terminal (+) of the injectors 12a and 12b, and the various output signals from the microprocessor and memory 16. The control logic 30 may include software executed by the microprocessor and memory 16 for processing the various inputs so as to generate control signals for each of the charge/discharge switches Q1, Q2, the selector switches Q3, Q4, and the regeneration switch Q5.

During operation of the drive circuit 20a, a drive pulse (or voltage waveform) is applied to the piezoelectric actuator of the fuel injectors 12a and 12b. The drive pulse varies between the charging voltage, $V_{CHARGE}$, and the discharging voltage, $V_{DISCHARGE}$. When the injector 12a is in a non-injecting state, prior to injection, the drive pulse is at $V_{CHARGE}$ so that a relatively high voltage is applied to the piezoelectric actuator. Typically, $V_{CHARGE}$ is around 200 to 300 V. When it is required to initiate an injection event, the drive pulse is reduced to $V_{DISCHARGE}$, which is typically around −100 V. To terminate injection, the voltage of the drive pulse is increased to its charging voltage level, $V_{CHARGE}$, once again.

The drive circuit 20a generally operates in three phases: (1) a discharge phase to open a selected one of the fuel injectors 12a,12b; (2) a charge phase to close the fuel injectors 12a and 12b; and (3) a regeneration phase for re-energising the energy storage devices C1 and C2 in the circuit 20a such that a dedicated power supply is not required. Each of these phases will now be described in detail.

During the discharge phase, the discharge switch Q2 is activated (i.e. closed) and one of the selector switches Q3 and Q4 is activated to select one of injectors 12a and 12b for injection. So, for example, if it is required to inject with the first injector 12a, the selector switch Q3 is closed. The other selector switch Q4 for the second injector 12b remains deactivated as the second injector 12b is not required to inject.

Assuming that it is desired to inject using the first injector 12a, upon activation of the discharge switch Q2, current is allowed to flow directly from the voltage supply 22 across the capacitor C2, through the selector switch Q3, and into the corresponding negative side of the selected injector 12a. A discharge current $I_{DISCHARGE}$ flows from the injector load for injector 12a, through the current sensing and control means 34, through the inductor L1, through the closed discharge switch Q2, and back to the negative terminal of the capacitor C2. As the selector switch Q4 remains open, and due to the presence of the diode D4, substantially no current is able to flow through the second injector 12b into the negative side of the injector 12b.

The current sensing and control means 34 monitors the current flow through the bi-directional current path 32 as it builds up and, as soon as the peak current threshold $I_P$ is reached, an output signal is generated to initiate de-activated (i.e. opening) of the discharge switch Q2. At this point, the current that is built-up in the inductor L1 recirculates through the diode D1 associated with the charge switch Q1. As a consequence, the direction of current flow through the inductor L1 and the selected one of the injectors 12a and 12b does not change. This is known as the "recirculation phase" of the discharging phase of operation of the drive circuit 20a.

During the recirculation phase, current flows directly from the negative side of the capacitor C1, through the selected switch Q3, through the selected injector 12a, through the current sensing and control means 34, through the inductor L1, and finally through the diode D1 and into the positive side of capacitor C1. During this recirculation phase, energy from the inductor L1 and the selected one of the piezoelectric injectors 12a or 12b is transferred to the capacitor C1 for energy storage therein.

The current sensing and control means 34 monitors the recirculation current, and when the recirculation current has fallen below the recirculation current threshold $I_R$, a signal is generated to reactivate the discharge switch Q2, thereby continuing the discharge operation. The voltage $V_{inj1}$ or $V_{inj2}$ across the selected injector 12a or 12b is also monitored by the voltage sensing means (not shown), and the cycle of current buildup and recirculation continues until the appropriate discharge voltage level (threshold $V_{DISCHARGE}$) has been achieved.

In this discharge cycle, the capacitor C2 provides energy, while the capacitor C1 receives energy for storage. Once the appropriate discharge voltage threshold $V_{DISCHARGE}$ is achieved, the half H-bridge drive circuit 20a is deactivated until a charge cycle is initiated.

In order to charge (i.e. close) the first injector 12a, the charge switch Q1 is activated, thus allowing a charge current $I_{CHARGE}$ to flow through the current path 32 and to the first injector 12a. This is known as the charging phase of operation of the drive circuit 20a. During the charging phase, the majority of the charge current $I_{CHARGE}$ will flow through the previously discharged injector (i.e. the first injector 12a). The second injector 12b that was not previously discharged will receive current if the corresponding voltage $V_{inj2}$ across it has dropped below the charge voltage threshold $V_{CHARGE}$.

The current sensing and control means 34 monitors the current buildup, and as soon as the peak current threshold $I_P$ is reached, the control logic 30 generates a control signal to open the charge switch Q1. At this point, the current that is built up in inductor L1 recirculates through the diode D2 associated with the (open) discharge switch Q2. This is the recirculation phase of the charging phase of operation of the drive circuit 26. Thus, the direction of current flow through the inductor L1 and injectors 12a and 12b does not change.

During the recirculation phase, current flows from the negative side of the second capacitor C2, through the diode D2 associated with the discharge switch Q2, through the inductor L1 and the current sensing and control means 34, through the injectors 12a and 12b, through the diodes D3 and D4, and into the positive side of energy storage capacitor C2. During this recirculation phase, energy from the inductor L1 and piezoelectric injectors 12a and 12b is transferred to the energy storage capacitor C2. The current sensing and control means 34 monitors the recirculation current, and when the recirculation current has fallen below the recirculation current threshold $I_R$, a signal is generated to reactivate the charge switch Q1 to continue the charge process. The voltage across the selected injector 12a is monitored, and the cycle of current buildup and recirculation continues until the appropriate charge voltage level (threshold $V_{CHARGE}$) has been achieved. In this charging phase, the energy storage capacitor C1 provides energy, and the energy storage capacitor C2 receives energy for storage. Once the appropriate charge voltage threshold $V_{CHARGE}$ is achieved, the half H-bridge drive circuit 20a is deactivated until a discharge cycle is initiated.

Following the charging phase, at the end of the injection event, the regeneration phase follows. During the regeneration phase, the regeneration switch Q5 (which has remained deactivated during the charge and discharge phases) is activated, and the discharge switch Q2 is opened and closed, under the control of the pulse-width modulated signal 26, until the voltages across the first C1 and second C2 capacitors reach predetermined levels (i.e. $V_{gc1}$ and $V_{gc2}$ in FIGS. 3a and 3b, respectively).

Figure 2B:
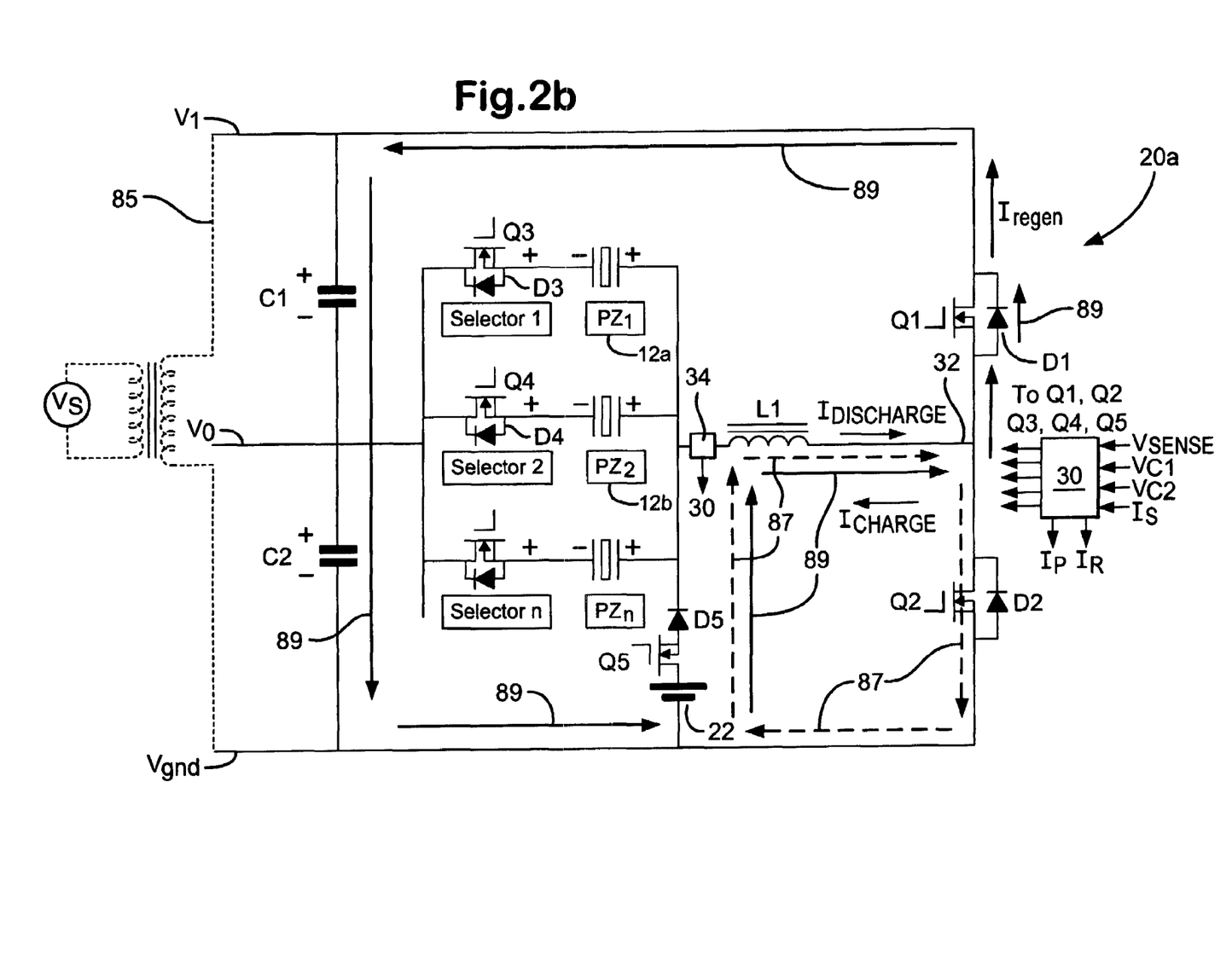
FIG. 2b shows the circuit diagram of FIG. 2a indicating the current flow path during a regeneration phase of operation of the circuit.

Referring to FIG. 2b, with the regeneration switch Q5 activated, while the discharge switch Q2 is switched on, current is drawn from the vehicle battery 22 and passes through the inductor L1 and the discharge switch Q2, as illustrated by the dashed arrows 87. When the discharge switch Q2 is switched off, current flows from the vehicle battery 22, through the inductor L1, through diode D1 associated with charge switch Q1, and passes through capacitors C1 and C2 (from positive to negative) such that the voltage $V_{C1}$ and $V_{C2}$ across the capacitors C1 and C2 increases and the energy stored thereon increases. Thus, during the regeneration phase, the inductor L1 elevates the battery voltage to increase the voltage on the first and second voltage supply rails $V_0$ and $V_1$ such that the voltage across the capacitors C1 and C2 also increases (i.e., the inductor L1 acts as a power supply means). The path of the current during the regeneration phase is illustrated by the solid arrows 89 in FIG. 2b.

Figure 3A:
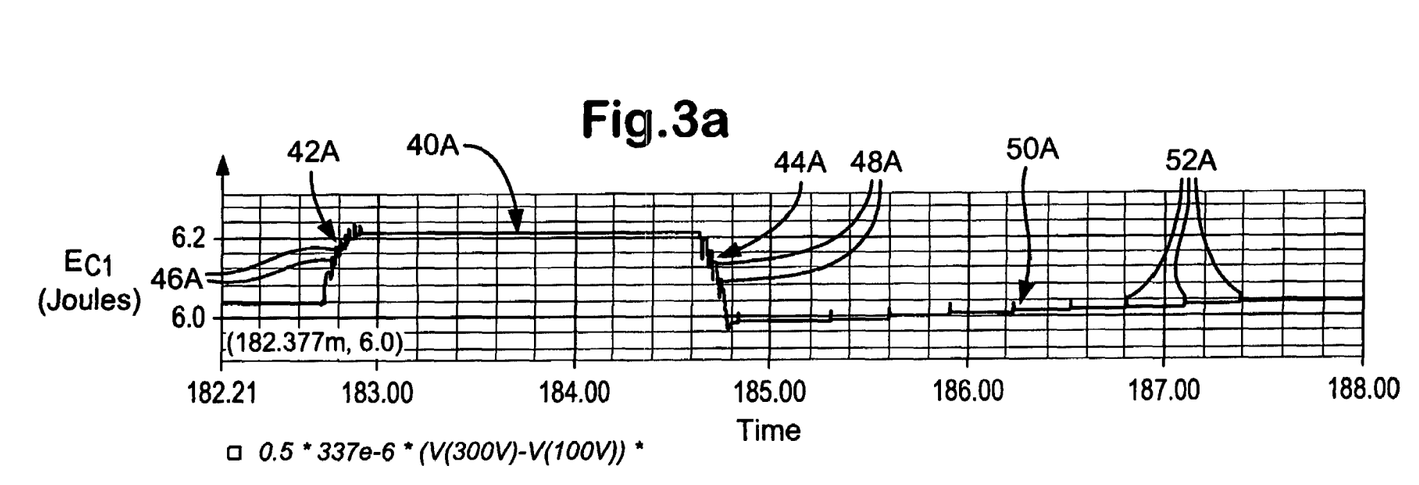
FIG. 3a is a graph to illustrate the energy levels in a first capacitor in the drive circuit of FIG. 2 during operation of the drive circuit.
Figure 3B:
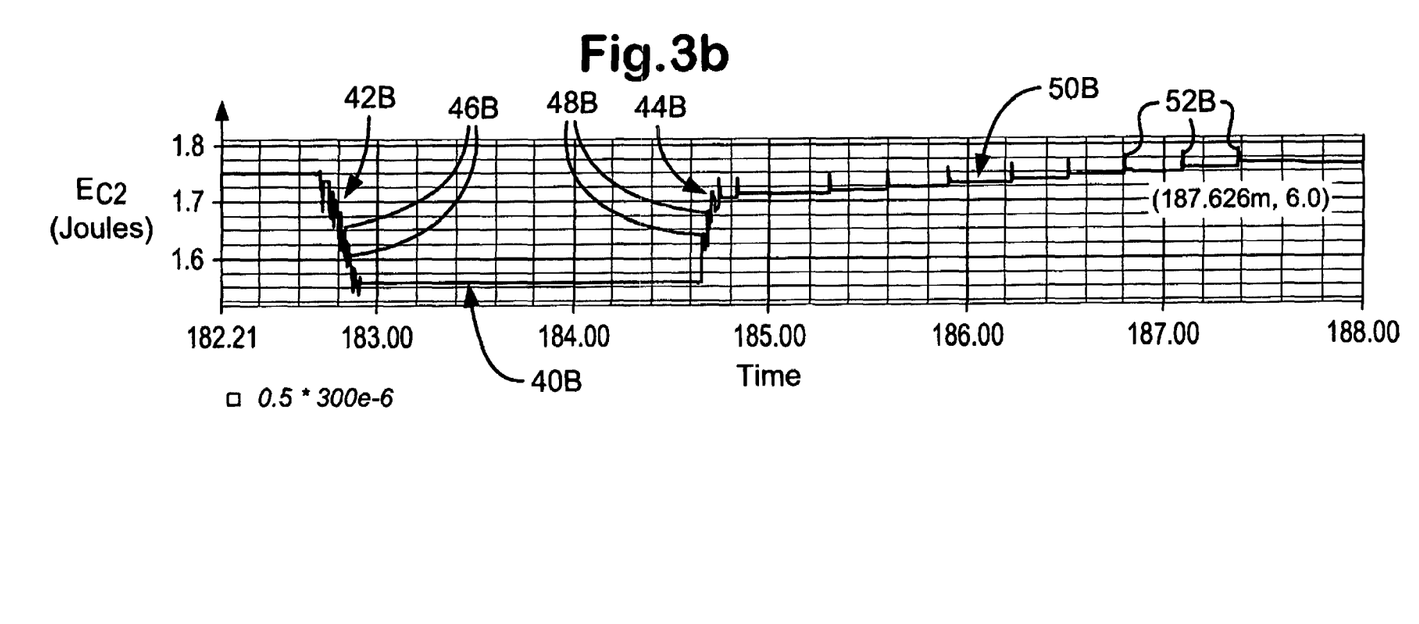
FIG. 3b is a graph illustrating the energy levels in a second capacitor in the drive circuit of FIG. 2 during operation of the drive circuit.

Referring now to FIGS. 3a and 3b, the energy Ec1 and Ec2 stored on the capacitors C1 and C2 are shown during discharge, charge and regeneration phases.

The energy $E_{C1}$ stored on the capacitor C1 (given by line 40A in FIG. 3a) is shown increasing via waveform 42A having spikes 46A during the discharge phase, and decreasing via waveform 44A having spikes 48A during the charge phase. Waveform 50A shows the energy stored on the capacitor C1 increasing during the regeneration phase while the discharge switch Q2 is pulsed on and off. Spikes 52A are also shown illustrating that energy is transferred to the first capacitor C1 every time the discharge switch Q2 is switched between activated (closed) and de-activated (open) states.

The energy Ec2 stored on the capacitor C2 (given by line 40B in FIG. 3b) is shown decreasing via waveform 42B having spikes 46B during the discharge phase, and increasing via waveform 44B having spikes 48B during the charge phase. Waveform 50B shows the energy stored on the capacitor C2 increasing during the regeneration phase while the discharge switch Q2 is pulsed on and off. Spikes 52B are also shown illustrating that energy is transferred to the second capacitor C2 every time the discharge switch Q2 is switched between activated (closed) and deactivated (open) states.

Figure 3C:
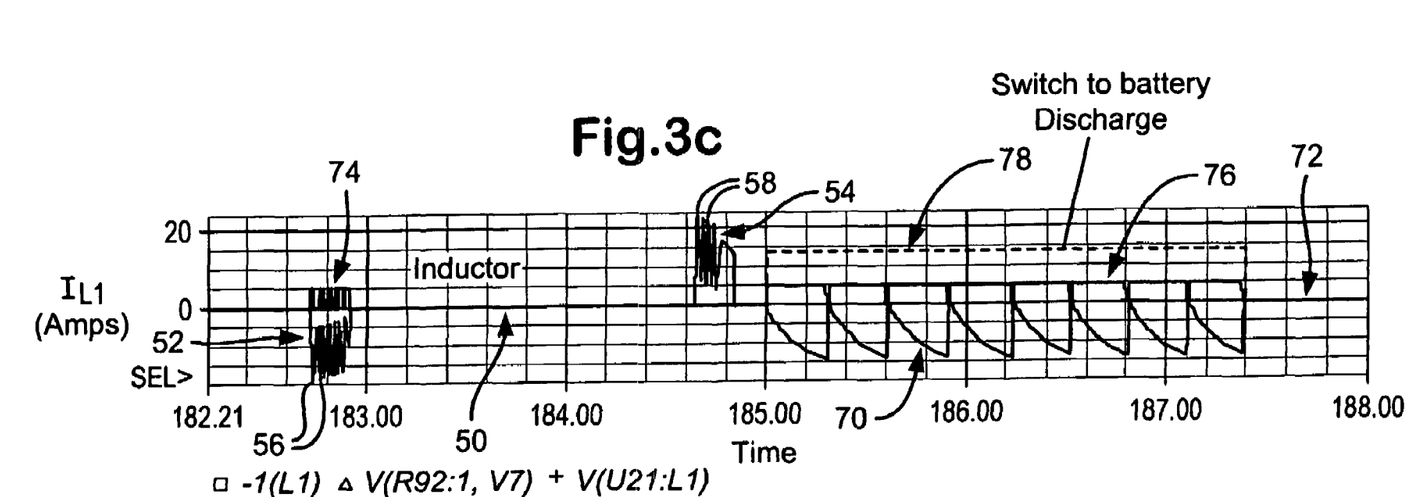
FIG. 3c is a graph showing the current in an inductor, the pulsing of a discharge switch, and the activation of a regeneration switch in the drive circuit of FIG. 2 during operation of the drive circuit.

FIG. 3c shows the current $I_{L1}$ through the inductor L1, the switching on and off of the discharge switch Q2, and the switching on and off of the regeneration switch Q5 during charge, discharge and regeneration phases.

Figure 3D:
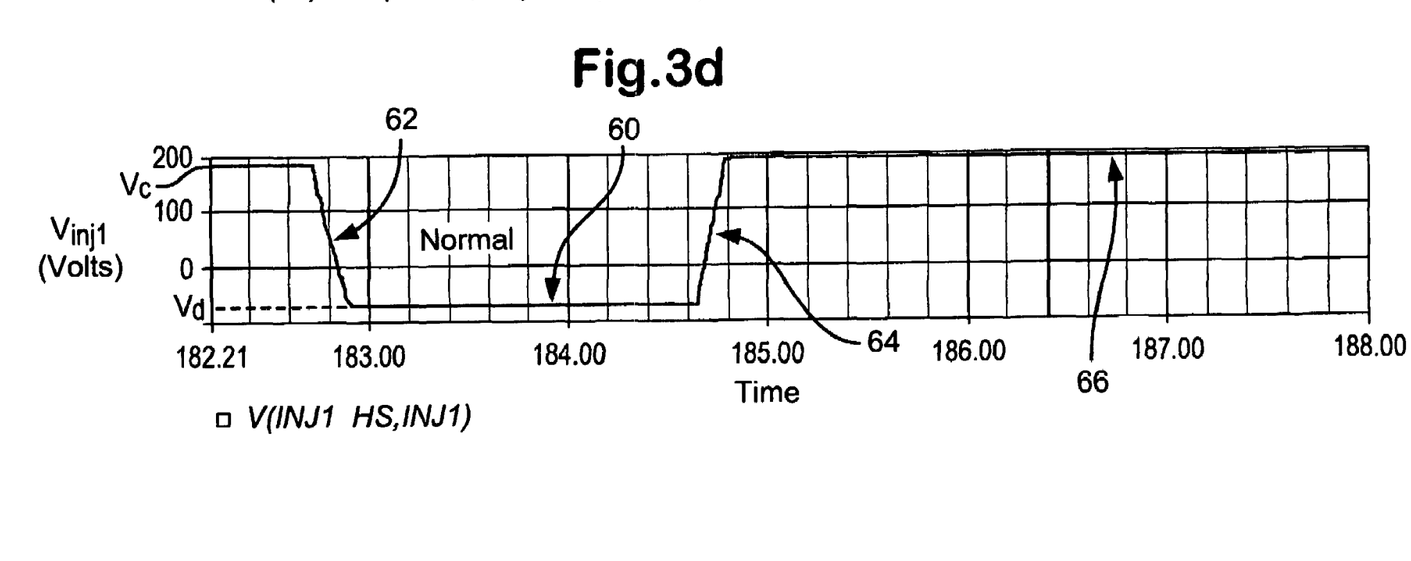
FIG. 3d is a graph to illustrate a drive pulse applied to a fuel injector to initiate and terminate an injection event.

The inductor current $I_{L1}$ (given by line 50) is shown ramping down to approximately minus twenty amps (−20 A) during current buildup and decaying back to about minus five amps (−5 A) during the recirculation phase of the discharge phase as shown by spikes 56 of waveform 52. During the charge phase, the inductor current $I_{L1}$ increases from about zero amps to approximately twenty amps (+20 A) during current buildup, and ramps back down to approximately five amps (+5 A) during the recirculation phase, as shown by spikes 58 of waveform 54. The spikes 56 and 58 of current $I_{L1}$ occur for as long as the voltage $V_{C2}$ or $V_{C1}$ is applied to discharge or charge the injector voltage $V_{inj1}$, as shown in FIG. 3d. Waveform 70 illustrates the inductor current $I_{L1}$ periodically decreasing from about zero amps to approximately minus 15 amps (−15 A) during the pulsing of the discharge switch Q2 during the regeneration phase (i.e. when regeneration switch Q5 is activated, as shown by the dashed line 78). The waveform 72 represents the control signal applied to the discharge switch Q2 to activate and deactivate the switch. So, for example, the waveform 74 illustrates the pulsing of the discharge switch Q2 during the recirculation phase of the discharge phase, while the waveform 76 represents the pulse-width modulated pulsing of the discharge switch Q2 during the regeneration phase of the circuit operation.

FIG. 3d shows the charge/discharge voltage $V_{inj1}$ across the injector 12a during charge, discharge and regeneration phases. The injector voltage $V_{inj1}$, shown by line 60 in FIG. 3d, shows the voltage $V_{inj1}$ of the first injector 12a decreasing in waveform 62 during the discharge phase and increasing in waveform 64 during the charge phase. Line 66 shows the voltage $V_{inj1}$ of the first injector 12a remaining substantially constant during the regeneration phase of the circuit operation.

In summary, when it is required to inject with a selected injector (e.g. the first injector 12a), the discharge switch Q2 and the selector switch Q3 of the first injector are both closed. During the discharge and recirculation phases that follow, the discharge switch Q2 is automatically opened and closed until the voltage across the selected injector 12a is reduced to the appropriate voltage discharge level (i.e. $V_{DISCHARGE}$, as shown in FIG. 3d) to initiate injection. After a predetermined time for which injection is required, closing of the injector 12a is achieved by closing the charge switch Q1, causing a charging current to flow through the first and second injectors 12a and 12b. During the subsequent charging and recirculation phases, the charge switch Q1 is continually opened and closed until the appropriate charge voltage level is achieved (i.e. $V_{CHARGE}$, as shown in FIG. 3d). During the regeneration phase, the regeneration switch Q5 is activated, and the discharge switch Q2 is periodically opened and closed under the control of the pulse-width modulated signal 26 until the voltage across the first C1 and second C2 capacitors reaches a predetermined level (i.e. $V_{gc1}$ and $V_{gc2}$ in FIGS. 3a and 3b, respectively).

Although the operation of the circuit 20a in the charge, discharge and regeneration phases has been explained with reference to the activation of the charge and discharge switches Q1 and Q2, in practice charge, discharge and regeneration of the injectors 12a and 12b can be controlled in a number of ways. Firstly, operation of the circuit 20a in these phases can be carried out by enabling the charge switch Q1 or discharge switch Q2, and using the peak current and recirculation current thresholds $I_P$ and $I_R$ to control the activation and deactivation of the charge switch or discharge switch (mode 1). Or, both activation and deactivation of the charge Q1 or discharge Q2 switches can be carried out under the direct control of the microprocessor 16 by pulsing the charge/discharge signal C/D (mode 2). Alternatively, the enabling of the charge switch or discharge switch can be carried out under the direct control of the microprocessor 16, and the deactivation of the charge switch or discharge switch can occur when the current flowing in the bidirectional path 32 falls below a reduced recirculation current thresholds $I_R$ (mode 3).

Figure 3E:
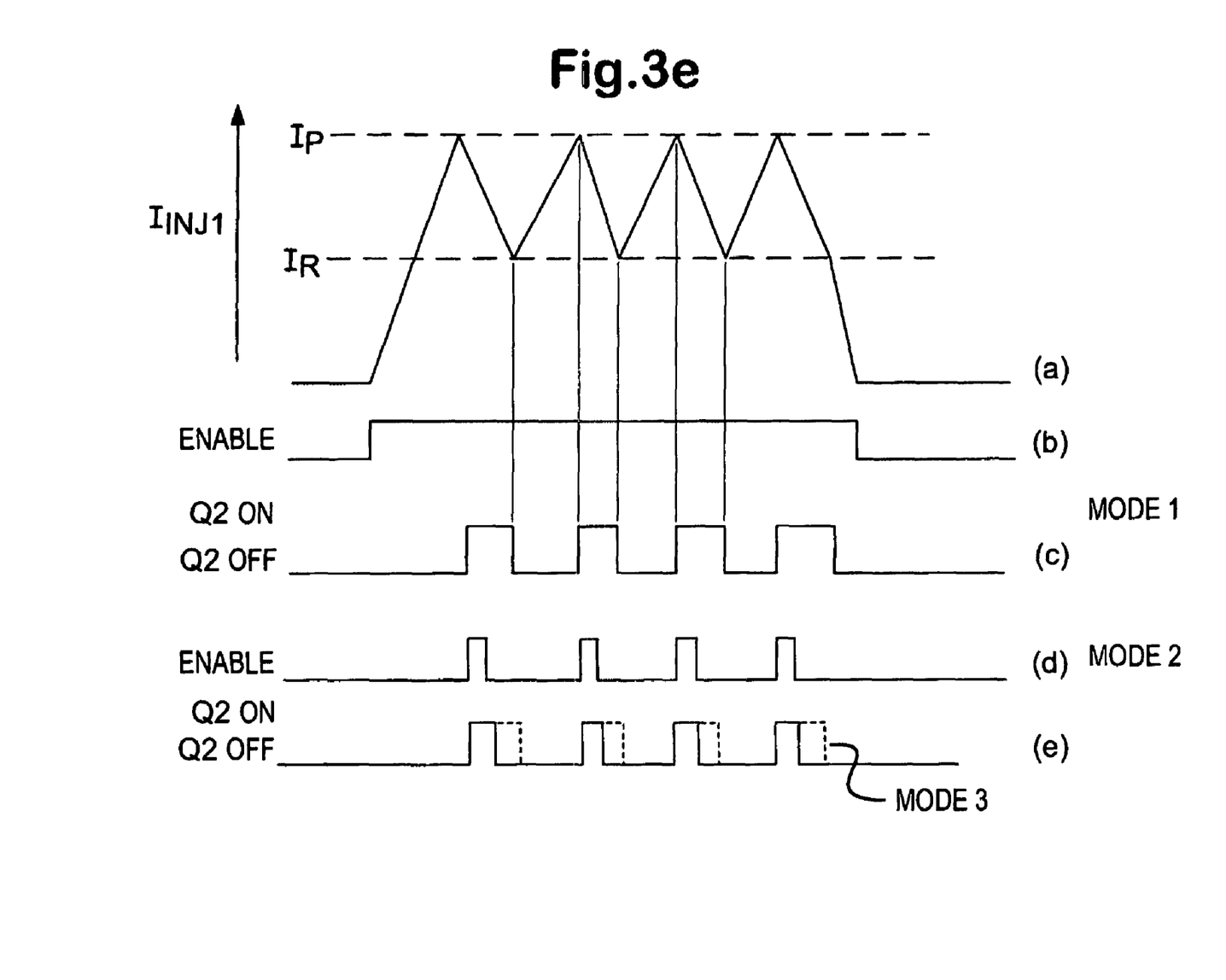
FIG. 3e illustrates the enabling/disabling and activation/deactivation of a switch during operation of the drive circuit of FIG. 2.

The aforedescribed modes are illustrated in FIG. 3e, where plot (a) firstly illustrates the current $I_{INJ1}$ flowing in the first injector 12a during a discharge phase (although the plot is equally applicable to the charge phase of operation). It can be seen that the current in the bidirectional path 32 is oscillating between the peak current threshold $I_P$ and the recirculation current threshold $I_R$. Plot (b) illustrates the C/D signal changing from low (disable) to high (enable) to enable the discharge switch Q2 during the discharge phase. Plot (c) shows the discharge switch Q2 switching on as the current reaches $I_P$, and switching off when the current falls to below $I_R$. Mode 2 is illustrated in plots (d) and (e) where the C/D signal (shown in plot (d)) is pulsed to enable and disable the discharge switch Q2 (shown in plot (e)).

Figure 4:
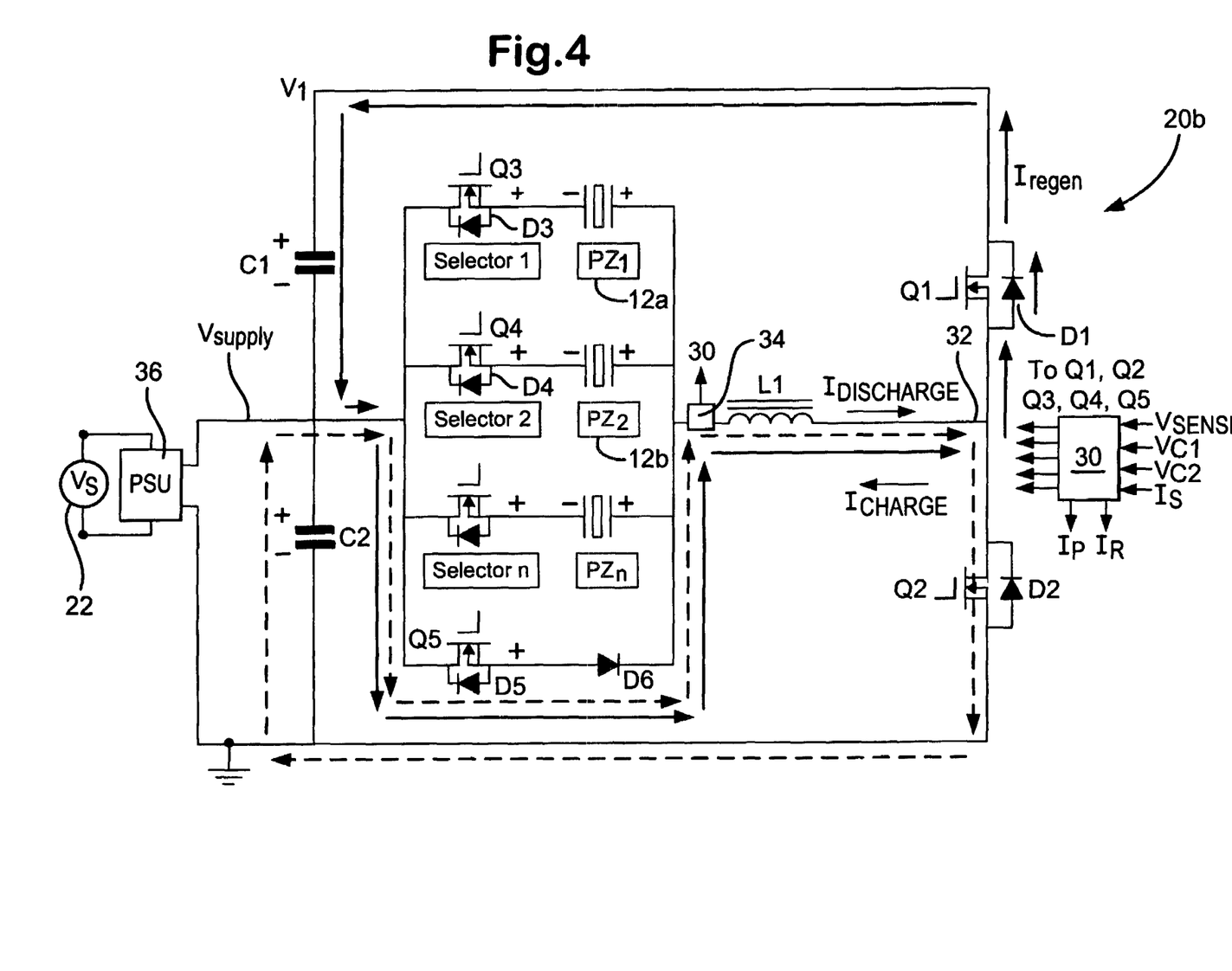
FIG. 4 is a circuit diagram illustrating the piezoelectric drive circuit of FIG. 1, and the current flow path through the circuit during the regeneration phase of operation of the circuit, according to a second embodiment of the present invention.

A drive circuit 20b according to a second embodiment of the present invention is shown in FIG. 4. The drive circuit 20b is generally configured as the drive circuit 20a of the first embodiment of the invention, with like components having identical reference numerals. As for the first drive circuit 20a, the second drive circuit 20b has first and second voltage supply rails $V_{supply}$ and $V_1$, and is generally configured as a half H-bridge having a middle circuit path 32 which serves as a bi-directional current path. The drive circuit 20b also includes an inductor L1 and a current sensing and control means 34 coupled in series with a parallel connection of injectors 12a and 12b. The second drive circuit 20b also includes a first (charging) switch Q1 and a second (discharging) switch Q2 at opposite corners of the half H-bridge arrangement, with each switch having a respective recirculation diode D1 and D2 connected across it to allow a recirculation current to return to the first C1 and second C2 energy storage capacitors during the recirculation phase, and a regeneration current $I_{regen}$ to flow to the energy storage capacitors during the regeneration phase.

The second drive circuit 20b also includes a voltage source 22, such as a vehicle battery, which may be connected to an optional power supply unit (PSU) 36. The power supply unit 36 (if required) is connected between ground and the voltage rail, $V_{supply}$, (which is a low voltage rail) and is arranged to supply energy to the second energy storage capacitor C2. The first energy storage capacitor C1 is connected across the first and second voltage supply rails $V_{supply}$ and $V_1$, whereas the second energy storage capacitor C2 is connected across the first voltage supply rail $V_{supply}$ and ground.

Each of the injectors 12a and 12b is connected in series with an associated selector switch Q3 and Q4, and each selector switch has an associated diode D3 and D4. The function of the selector switches and associate diodes is as described for the first drive circuit 20a.

A regeneration switch Q5 is included in the circuit 20b in parallel with the first 12a and second 12b injectors, for connecting the second energy storage capacitor C2 to the inductor L1. The regeneration switch Q5 typically takes the form of an IGBT having a gate coupled to a gate drive which is powered at a bias supply input. The regeneration switch Q5 has an associated protection diode D5 connected in parallel thereto. A further diode D6 is connected in series with the regeneration switch Q5 for preventing current flowing therethrough during the charge phase.

The current sensing and control means 34 located in the middle circuit path 32 has the same function as in the first circuit 20a and will therefore not be described further. A voltage sensing means (not shown) is also provided, as previously described.

The operation of the second drive circuit 20b is generally as described for the first drive circuit 20a, but with some differences during the regeneration phase of operation of the circuit due to the presence of the voltage supply 22 (and optionally the PSU 36) being connected to the $V_{supply}$ rail of the circuit.

As for the first embodiment of the invention, the regeneration phase follows the charging phase, at the end of the injection event. During the regeneration phase, the regeneration switch Q5 (which has remained in its deactivated state during the charge and discharge phases) is activated, and the discharge switch Q2 is opened and closed, under the control of the pulse-width modulated signal 26, until the energy on the first C1 capacitor reaches a predetermined level (i.e. $E_{C1}$ in FIG. 5a). As in the first embodiment of the invention, the discharge switch Q2 may be enabled during the regeneration phase (and the charge/discharge phases) in the manner previously described.

Referring again to FIG. 4, with the regeneration switch Q5 activated, while the discharge switch Q2 is on, current is drawn from the vehicle battery 22 (or the PSU 36) and passes through the regeneration switch Q5, the diode D6, the inductor L1, the discharge switch Q2, and through the second energy storage capacitor C2 (as illustrated by the dashed arrows) such that the energy on the second capacitor C2 decreases. When the discharge switch Q2 is switched off, current flows from the first capacitor C1, through the regeneration switch Q5, the diode D6, the inductor L1, and the diode D1 associated with the charge switch Q1, such that the energy on the first capacitor C1 increases (shown by the bold arrows). Thus, during the regeneration phase in the second embodiment of the invention, the inductor L1 transfers energy from the second energy storage capacitor C2 to the first energy storage capacitor C1, and the vehicle battery 22 (or the PSU 36) maintains the voltage on C2. Thus, the regeneration phase is used to transfer battery voltage to the second voltage supply rail $V_1$ such that the voltage across the first energy storage capacitor C1 increases.

Figure 5A:
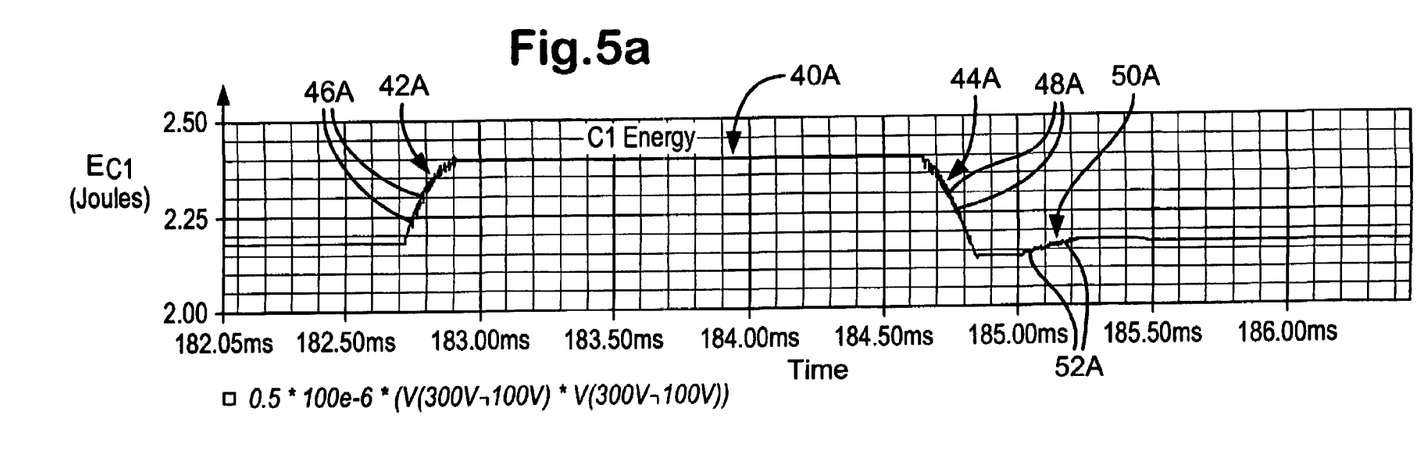
FIG. 5a is a graph illustrating the energy levels in the first capacitor in the drive circuit of FIG. 4 during operation of the drive circuit.
Figure 5B:
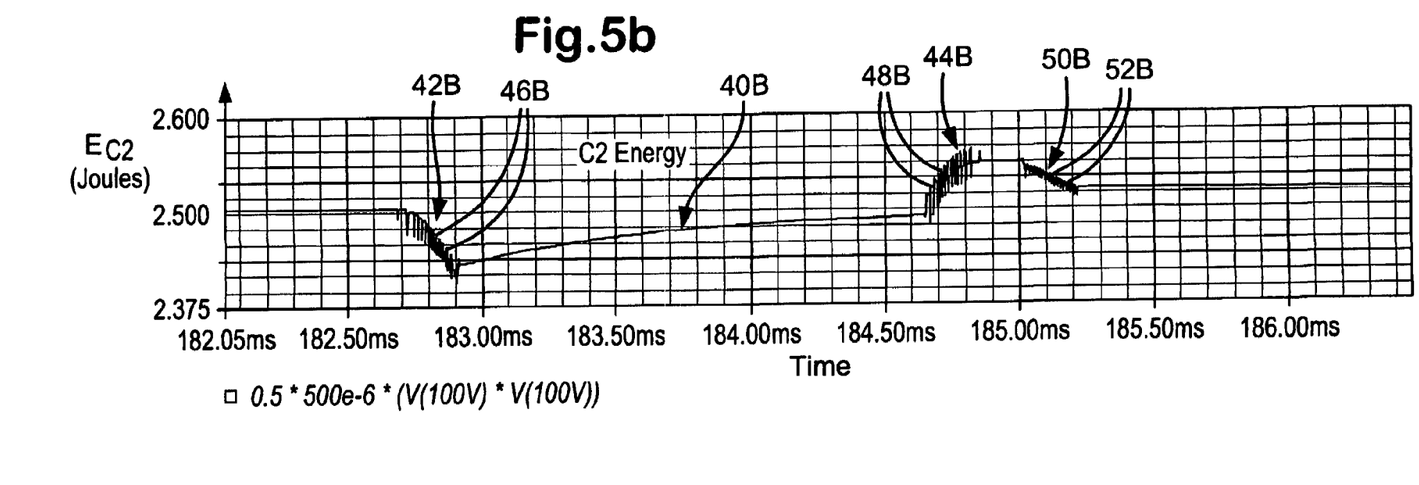
FIG. 5b is a graph illustrating the energy levels in the second capacitor in the drive circuit of FIG. 4 during operation of the drive circuit.

Referring now to FIGS. 5a and 5b, the energy $E_{C1}$ and $E_{C2}$ stored on the first C1 and second C2 capacitors is shown during the discharge, charge and regeneration phases.

The energy $E_{C1}$ stored on the first capacitor (given by line 40A in FIG. 5a) is shown increasing via waveform 42A having spikes 46A during the discharge phase, and decreasing via waveform 44A having spikes 48A during the charge phase. Waveform 50A shows the energy stored on the first capacitor C1 increasing during the regeneration phase while the discharge switch Q2 pulses on and off. Spikes 52A are also shown, illustrating that energy is transferred to the first capacitor C1 every time the discharge switch Q2 switches between its activated (closed) and de-activated (open) states.

The energy $E_{C2}$ stored on the second capacitor C2 (given by line 40B in FIG. 5b) is shown decreasing via waveform 42B having spikes 46B during the discharge phase, and increasing via waveform 44B having spikes 48B during charge phase. Waveform 50B shows the energy stored on the second capacitor decreasing during the regeneration phase while the discharge switch Q2 is pulsed on and off. The spikes 52B show that energy is transferred from the second capacitor C2 (and onto the first capacitor C1) every time the discharge switch Q2 is switched between activated (closed) and deactivated (open) states.

Figure 5C:
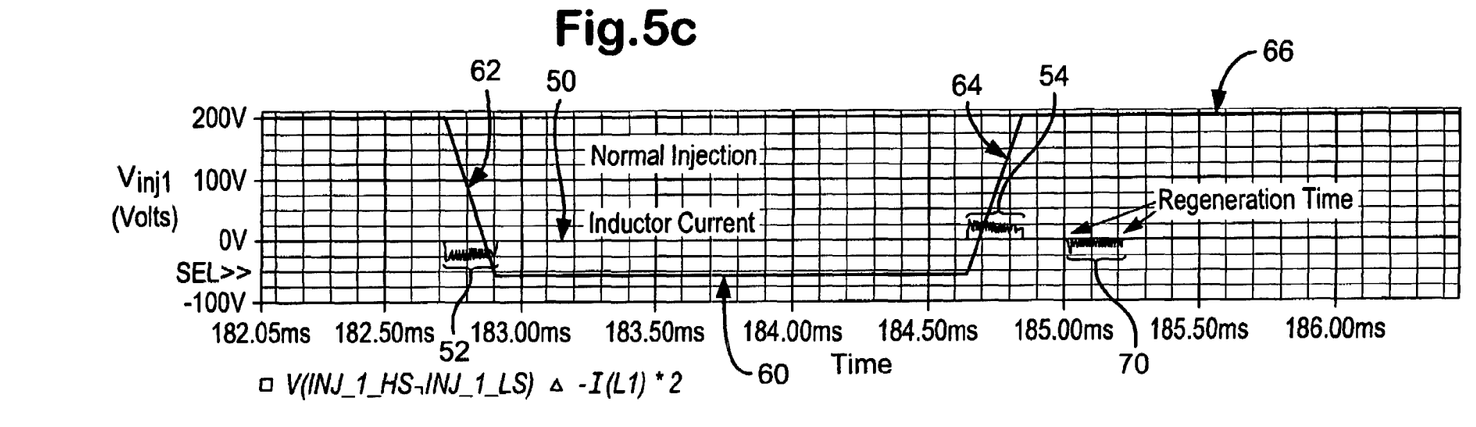
FIG. 5c is a graph illustrating the current in the inductor, and the drive pulse applied to a fuel injector to initiate and terminate an injection event.

FIG. 5c shows the current $I_{L1}$ through the inductor L1, the charge/discharge voltage $V_{inj1}$ across the injector 12a during charge, discharge and regeneration phases.

The inductor current $I_{L1}$ (given by line 50) is shown ramping down to approximately minus twenty five amps (−25 A) during current buildup, and decaying back to about minus five amps (−5 A) during the recirculation phase of the discharge phase, as shown by spikes of waveform 52. During the charge phase, the inductor current $I_{L1}$ increases from about zero amps to approximately twenty five amps (+25 A) during current buildup, and ramps back down to approximately five amps (+5 A) during the recirculation phase, as shown by the spikes of waveform 54. The spikes of current $I_{L1}$ occur for as long as the voltage is applied to discharge or charge the injector voltage $V_{inj1}$. Waveform 70 illustrates the inductor current $I_{L1}$ periodically decreasing from about zero amps to approximately minus fifteen amps (−15 A) during the pulsing of the discharge switch Q2 during the regeneration phase.

The injector voltage $V_{inj1}$ (given by line 60) shows the voltage of the first injector 12a decreasing in waveform 62 during the discharge phase, and increasing in waveform 64 during the charge phase. Line 66 shows the voltage $V_{inj1}$ remaining substantially constant during the regeneration phase.

Having described preferred embodiments of the present invention, it is to be appreciated that the embodiments in question are exemplary only and that variations and modifications such as will occur to those possessed of the appropriate knowledge and skills may be made without departure from the scope of the invention as set forth in the appended claims.

For example, the piezoelectric injectors 12a, and 12b described herein operate in a discharge mode which discharges an injector to open the injector valve to inject fuel, and further operate in a charge mode which charges an injector to close the injector valve to prevent injection of fuel. In this case, the injectors are of the negative-charge displacement type. However, the drive circuits 20a and 20b described herein could be otherwise configured to open during a charge mode and close during a discharge mode for an injector of the positive-charge displacement type.

While two piezoelectric fuel injectors 12a and 12b are shown and described in connection with the drive circuits 20a and 20b of the present invention, it should be appreciated that the engine 10 may include one or more fuel injectors, all of which could be controlled by the drive circuits 20a and 20b.

The drive circuits 20a and 20b described herein maybe integrated in the engine control module 14, or may be provided separate therefrom.

The invention claimed is:

1. A drive circuit for an injector arrangement having at least one injector, the drive circuit comprising:
   a first charge storage device configured and arranged for operative connection with one of the at least one injectors during a discharging phase so as to permit a discharge current to flow therethrough, thereby to initiate an injection event;
   a second charge storage device configured and arranged for operative connection with the at least one injector during a charging phase so as to cause a charge current to flow therethrough, thereby to terminate the injection event;

a switch controller configured and arranged for controlling whether the first charge storage device is operably connected to the at least one injector or whether the second charge storage device is operably connected to the at least one injector;

a first voltage rail at a first voltage level;

a second voltage rail at a second voltage level higher than the first voltage level;

a voltage supply; and a regeneration switch configured and arranged to be operable at the end of the charging phase to transfer charge from the voltage supply to at least the second charge storage device via an energy storage device, prior to a subsequent discharging phase.

2. The drive circuit as claimed in claim 1, wherein the first charge storage device is connected across the first voltage rail and ground.

3. The drive circuit as claimed in claim 1, wherein the second charge storage device is connected across the first and second voltage rails.

4. The drive circuit as claimed in claim 1, further comprising a switch arrangement including a first switch operable to close so as to activate the charging phase, and a second switch operable to close so as to activate the discharging phase.

5. The drive circuit as claimed in claim 4, wherein the regeneration switch is operable at the end of the charging phase to transfer charge from the voltage supply to the first charge storage device and the second charge storage device.

6. The drive circuit as claimed in claim 4, wherein the regeneration switch is operable at the end of the charging phase to transfer charge from the voltage supply to the first charge storage device, and from the first charge storage device to the second charge storage device via the energy storage device.

7. The drive circuit as claimed in claim 5, wherein the regeneration switch is operable to transfer charge from the voltage supply to the first and second charge storage devices in response to the operation of the second switch during the regeneration phase.

8. The drive circuit as claimed in claim 6, wherein the regeneration switch is operable to transfer charge from the voltage supply to the first charge storage device in response to the operation of the second switch during the regeneration phase.

9. The drive circuit as claimed in claim 1, wherein the first and second charge storage devices comprise capacitors.

10. The drive circuit as claimed in claim 1, further comprising first and second injectors that are arranged in parallel and operatively connected to the switch controller, the regeneration switch, and a further switch for controlling independent selection of the first or second injector to permit a discharge current to be supplied to the selected injector during a discharging phase so as to initiate an injection event.

11. The drive circuit as claimed in claim 10, wherein the drive circuit is substantially configured as a half H-bridge circuit having a middle circuit branch, with the first and second injectors being arranged in parallel in the middle circuit branch.

12. The drive circuit as claimed in claim 10, further comprising a voltage sensor configured and arranged for sensing the voltage across each injector, and a control configured and arranged for receiving a signal indicative of the sensed voltage.

13. The drive circuit as claimed in claim 12, wherein the control is arranged to provide a terminate control signal to the further switch to terminate the charging phase of the selected injector once a predetermined charge threshold voltage is sensed.

14. The drive circuit as claimed in claim 13, wherein the control is further arranged to provide an initiate signal to the switch controller to initiate the charging phase of the selected injector.

15. The drive circuit as claimed in claim 13, wherein the control is arranged to provide an initiate signal to the regeneration switch to initiate the regeneration phase, and to provide a termination signal to the regeneration switch to terminate the regeneration phase.

16. The drive circuit as claimed in claim 14, wherein the control is further arranged to provide a terminate control signal to the further switch to terminate the discharging phase of the selected injector once a predetermined discharge threshold voltage is sensed.

17. The drive circuit as claimed in claim 16, wherein the control is further arranged to provide an initiate control signal to the switch controller to initiate the discharging phase of the selected injector.

18. The drive circuit as claimed in claim 12, wherein the control is arranged to provide a pulse width modulated signal to alternately provide enable and disable signals to the switch controller during the regeneration phase, thereby to transfer energy to and from the energy storage device.

19. The drive circuit as claimed in claim 1, wherein the at least one injector comprises a piezoelectric actuator.

* * * * *